Nov. 29, 1932.  J. SOLTIS ET AL  1,889,707
TROLLING DEVICE
Filed Aug. 25, 1931
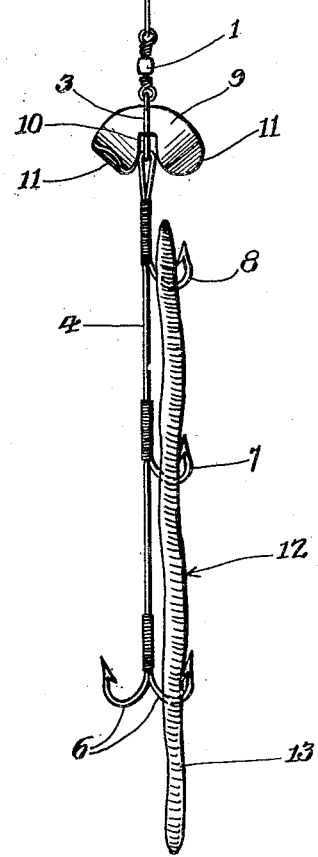
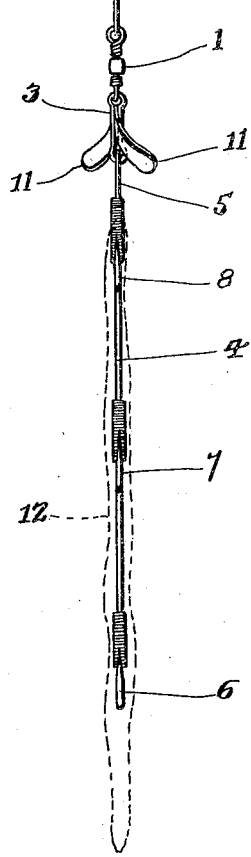
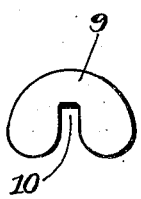
Inventor
Joseph Soltis
Charles Rindgen
Geo. P. Kimmel
Attorney Patented Nov. 29, 1932

1,889,707

UNITED STATES PATENT OFFICE

JOSEPH SOLTIS, OF PLAINS, AND CHARLES RINDGEN, OF WILKES-BARRE, PENNSYLVANIA

TROLLING DEVICE

Application filed August 25, 1931. Serial No. 559,310.

This invention relates to a trolling device.

Among the objects of the invention are to provide a trolling device including a gang of hooks and a spinner which will spin as a unit when drawn through the water; to provide such a device embodying novel means for securing bait thereto whereby the latter will have a live appearance in the use of the device and whereby a fish is almost sure to be hooked when attempting to secure the bait; and to provide the foregoing advantages in a trolling device which is of extremely simple and inexpensive construction.

With the foregoing and other objects in view, the invention consists of such parts and combination of parts as fall within the scope of the invention as claimed.

In the accompanying drawing:

Figure 1 is an elevation of a baited trolling device in accordance with this invention.

Figure 2 is a similar view taken at a right angle to Figure 1.

Figure 3 is a plan of the blank from which the spinner forming a part of the device is formed.

Referring to the drawing in detail, the numeral 1 indicates a swivel having one end connected with a leader 2 and having its opposite end connected with an elongated loop 3 which is also connected with a hook supporting member 4. The hook supporting member 4 preferably is formed of a relatively light wire of semi-rigid consistency formed at one end with a loop 5 extending through the loop 3, and connected at its opposite end with a pair of hooks 6. The hooks 6 project laterally from the member 4 in opposite directions, and in alignment with one of the hooks 6, longitudinally of the member 4, are a pair of similar hooks 7 and 8. The shanks of each of the hooks are rigidly secured to and lengthwise of member 4. The shank of a hook 6 and the shanks of the hooks 7 and 8 are secured to the same side of member 4 and the shank of the other hook 6 is secured to the opposite side of member 4. Any suitable means for such purpose may be employed, by way of example, a wrapping is illustrated for such purpose. The hooks are stationary with respect to the supporting member.

Carried by the loop 3 is a spinner 9 which is formed from a blank of relatively light, malleable metal as shown in Figure 3. The spinner 9 is of substantially semi-circular form and provided centrally of a side edge with a recess 10. The spinner 9 is inserted through the loop 3 with the latter extending through the recess 10 and the loop is soldered or otherwise secured to the spinner. On opposite sides of the recess 10, the spinner 9 is curved in opposite directions as indicated at 11 in order that the spinner will be rotated when drawn through the water.

The device is particularly adapted for use in connection with fish worms or night crawlers as bait. Such a worm is shown at 12 and is secured to the device by passing the hook 8 therethrough adjacent the head thereof, then successively passing the hook 7 and hook 6 aligned therewith through the worm with the tail portion 13 of the worm projecting beyond the free end of the supporting member 4. Owing to the rigid connection between the spinner 9, loop 3 and supporting member 4, such part will spin as a unit when the device is drawn through the water which imparts a revolving motion to the bait 12 to attract the fish. Owing to the disposition of the hooks 7 and 8 with respect to each other and to the bait, it is practically impossible for a fish to secure the bait without becoming caught on one of the hooks.

It is to be understood that the embodiment of the invention herein illustrated and described is to be considered as a preferred example of the same, and that such changes in the details of construction may be made as fall within the scope of the claims hereunto appended.

We claim:

1. In a trolling device, a swivel, a semi-rigid, one-piece supporting member common to a plurality of hooks, a loop connecting the hook supporting member with the swivel, a spinner inserted through and secured to said loop, a pair of hooks rigidly secured to the free end of the hook supporting member and projecting laterally therefrom in opposite directions, and a pair of spaced hooks rigidly secured to and extended laterally from one side of the hook supporting member, in alignment with each other and in spaced alignment with one of the hooks secured to the free end of the hook supporting member.

2. In a trolling device, a swivel to be connected to the outer end of a lead, a one-piece supporting member common to a set of hooks, a loop attached at one end to the inner end of said member and at its other end to the outer end of the swivel, a spinner extending through, projecting laterally in opposite directions from and secured to said loop, a pair of hooks rigidly anchored to the outer end of said member and projecting laterally from such end in opposite directions, and a plurality of spaced hooks rigidly secured to and extended laterally from one side of said member, arranged in alignment with each other and in spaced alignment with one of the hooks at the outer end of said member, and the said several hooks being stationary with respect to the latter.

3. In a trolling device, a swivel to be connected to the outer end of a lead, a supporting member common to a set of hooks, means for connecting the inner end of said member to the swivel, a spinner carried by said means, a pair of hooks rigidly secured to said member and projecting laterally in opposite directions from the outer end of the latter, and a plurality of spaced aligning hooks rigidly secured to and projecting laterally from one side of said member, the outer hook of said plurality of hooks being in spaced alignment to one of the hooks extended from the outer end of said member and the said several hooks being stationary with respect to the latter.

4. In a trolling device, a swivel to be connected to a lead, a spinner carrier attached to and bodily movable with the swivel, a one-piece continuous supporting member for a set of hooks and secured at one end to said carrier, a pair of hooks rigidly secured to said member and projecting laterally in opposite directions with respect to the outer end of said member, and a plurality of spaced aligning hooks rigidly secured to and extended laterally from one side of said member and with the outer hook of said plurality of hooks arranged in spaced alignment with one of said hooks of said pair, and the said several hooks being stationary with respect to said member.

5. In a trolling device, a swivel to be connected to a lead, a hook supporting member, means for connecting the inner end of said member to said swivel, and spaced hooks having the shanks thereof rigidly secured in endwise opposed spaced relation at spaced points and lengthwise of said member and having their bills extended laterally from one side of said member, said bills positioned in opposed spaced relation, and a hooking means having a part thereof secured to the outer terminal portion of said member, aligning with and spaced from the shanks of the other hooks, and said hooking means extending laterally from a side of said member.

In testimony whereof, we affix our signatures hereto.

JOSEPH SOLTIS.
CHARLES RINDGEN.